United States Patent
Aseev

(10) Patent No.: US 11,675,577 B2
(45) Date of Patent: Jun. 13, 2023

(54) SYSTEMS AND METHODS OF ORCHESTRATING NODES IN A BLOCKCHAIN NETWORK

(71) Applicant: CHAINSTACK PTE. LTD., Singapore (SG)

(72) Inventor: Evgeny A Aseev, Singapore (SG)

(73) Assignee: CHAINSTACK PTE. LTD., Singapore (SG)

(*) Notice: Subject to any disclaimer, the term of this patent is extended or adjusted under 35 U.S.C. 154(b) by 44 days.

(21) Appl. No.: 17/188,627

(22) Filed: Mar. 1, 2021

(65) Prior Publication Data
US 2021/0271461 A1 Sep. 2, 2021

Related U.S. Application Data

(60) Provisional application No. 62/983,966, filed on Mar. 2, 2020.

(51) Int. Cl.
*G06F 8/61* (2018.01)
*G06F 9/455* (2018.01)
*H04L 9/06* (2006.01)

(52) U.S. Cl.
CPC .......... *G06F 8/61* (2013.01); *G06F 9/45558* (2013.01); *H04L 9/0618* (2013.01); *G06F 2009/45575* (2013.01)

(58) Field of Classification Search
CPC ............ G06F 8/61; G06F 9/45558; G06F 2009/45575; H04L 9/0618
See application file for complete search history.

(56) References Cited

U.S. PATENT DOCUMENTS

| | | | |
|---|---|---|---|
| 2004/0177244 A1* | 9/2004 | Murphy | G06F 9/5077 713/100 |
| 2013/0055231 A1* | 2/2013 | Hyndman | G06F 8/658 717/169 |
| 2016/0275461 A1* | 9/2016 | Sprague | H04W 12/06 |
| 2017/0031676 A1* | 2/2017 | Cecchetti | G06F 8/65 |
| 2017/0302663 A1* | 10/2017 | Nainar | H04L 9/3247 |
| 2019/0163912 A1* | 5/2019 | Kumar | H04L 9/3263 |
| 2020/0195497 A1* | 6/2020 | Obaidi | G06F 9/45558 |

* cited by examiner

*Primary Examiner* — Wei Y Zhen
*Assistant Examiner* — Brahim Bourzik
(74) *Attorney, Agent, or Firm* — ArentFox Schiff LLP; Michael Fainberg

(57) ABSTRACT

Disclosed herein are systems and method for orchestrating nodes in a blockchain network. In an exemplary aspect, a method may comprise receiving a request to deploy a new node on a device for participation in the blockchain network. The method may comprise detecting missing dependencies on the device by comparing the blockchain network parameters and the deployment requirements of the blockchain network with the set of capabilities and configurations of the device. The method may comprise preconfiguring the new node by packaging the missing dependencies. The method may further comprise determining whether the new node can transact with at least one node of the blockchain network. In response to determining that the new node cannot transact with the at least one node of the blockchain network, the method may comprise troubleshooting deployment of the new node.

21 Claims, 4 Drawing Sheets

SYSTEMS AND METHODS OF ORCHESTRATING NODES IN A BLOCKCHAIN NETWORK

CROSS-REFERENCE TO RELATED APPLICATIONS

This application claims the benefit of U.S. Provisional Application No. 62/983,966, filed Mar. 2, 2020, which is herein incorporated by reference.

FIELD OF TECHNOLOGY

The present disclosure relates generally to the field of blockchain networks, and more specifically, to systems and methods of orchestrating nodes in a blockchain network.

BACKGROUND

Typically, blockchain networks comprise multiple distributed nodes processing transactions and storing data. The blockchain nodes exchange information in a peer-to-peer manner, which increases the decentralization of a blockchain-based system and eliminates the need for a middleman. Blockchains utilize sophisticated encryption techniques and consensus mechanisms for coordination. This enables blockchains to be highly secure, transparent, and offer improved traceability.

The price for these benefits is a greater complexity of such distributed systems to get them up and running. Network and node configuration, deployment, and management in heterogeneous environments is difficult due to different complexities. An average user needs to learn how to setup a blockchain protocol software in their local environment, set up the environment, install countless dependencies manually, troubleshoot, manage additional network members manually, etc. This process may take several hours to days depending on the expertise of the user and the extent to which troubleshooting occurs.

Accordingly, there is a need to streamline the deployment of new nodes in a blockchain network to enable communication amongst nodes in the network.

SUMMARY

To address these shortcomings of conventional systems, aspects of the disclosure describe methods and systems for orchestrating nodes in a blockchain network.

In an exemplary aspect, a method may comprise receiving a request to deploy a new node on a device for participation in the blockchain network. The method may comprise retrieving both blockchain network parameters and deployment requirements of the blockchain network. The method may comprise determining a set of capabilities and configurations of the device. The method may comprise detecting missing dependencies on the device by comparing the blockchain network parameters and the deployment requirements with the set of capabilities and configurations. The method may comprise preconfiguring the new node by packaging the missing dependencies and libraries for successfully deploying the new node. Subsequent to installing the missing dependencies and the libraries on the device, the method may comprise determining whether the new node can transact with at least one node of the blockchain network. In response to determining that the new node cannot transact with the at least one node of the blockchain network, the method may comprise troubleshooting deployment of the new node.

In some aspects, troubleshooting the deployment comprises detecting an incompatibility between the new node and the blockchain network and reconfiguring the new node to resolve the incompatibility.

In some aspects, the method may comprise receiving a request to deploy a new node on a different device for participation in the blockchain network. The method may comprise determining a set of capabilities and configurations of the different device, and detecting a different set of missing dependencies on the different device. The method may comprise preconfiguring the new node on the different device by packaging the different set of missing dependencies and libraries for successful deployment.

In some aspects, the method may comprise receiving a request to deploy a new node on the device for participation in a different blockchain network. The method may comprise retrieving both blockchain network parameters and deployment requirements of the different blockchain network. The method may comprise detecting a different set of missing dependencies on the device, and preconfiguring the new node on the device by packaging the different set of missing dependencies and libraries for successful deployment in the different blockchain network.

In some aspects, a type of the blockchain network is one of a hybrid cloud environment, a private cloud environment, and a public cloud environment, further comprising preconfiguring the new node further based on the type of the blockchain network.

In some aspects, the missing dependencies comprise at least one of (1) a container orchestration engine, (2) network capabilities, (3) a number of communication ports, and (4) user permissions.

In some aspects, determining whether the new node can transact with at least one node of the blockchain network comprises creating a transaction from the new node to the at least one node, and detecting whether the transaction was successful.

In some aspects, determining whether the new node can transact with at least one node of the blockchain network comprises determining whether the new node has been discovered by the at least one node via a discovery protocol.

In some aspects, the method may comprise transmitting a local orchestrator engine to a user, wherein the local orchestrator engine preconfigures new nodes within a secured environment of the user with minimized latency.

In some aspects, the method may comprise registering the new node prior to installing the missing dependencies based on the deployment requirements of the blockchain network.

In some aspects, determining the set of capabilities and configurations of the device comprises receiving the set of capabilities and configurations from an agent installed on the device, wherein the agent communicates with an orchestration engine.

In some aspects, the method may comprise removing the new node from the blockchain network, and deregistering the new node from the blockchain network.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of launching new nodes and provisioning the nodes with complex configuration in a heterogeneous environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure provide blockchain nodes as a service. Customers can deploy a new blockchain network or create a node to connect to an existing blockchain network. The deployment may involve preconfiguring the node (e.g., adjusting node configuration file(s) and command line arguments in order for the node to join a particular network successfully).

Due to the various types of blockchain networks and their respective configurations, however, a new node may not perfectly join a blockchain network. For example, some settings of the new node may be incompatible with the rest of the blockchain network or may not be configured, preventing the node from joining. Consider an Ethereum network. When adding a Geth node (i.e., a node running Geth (Go Ethereum), which is a command line interface implemented in Go Language), there are several deployment requirements and network parameters to consider including a network ID, a consensus algorithm, a genesis block, and bootstrap nodes. If a new Geth node is not configured to know these parameters, the Geth node will fail to join the network. In another example, consider a Hyperledger Fabric network. The deployment requirements and network parameters to consider here are at least the ordering service, policy configuration(s), channel configuration(s), and identification of existing peers. If a new member node is not configured to know these parameters, it will fail to join the network. Orchestration is therefore needed to reconfigure the new node as needed and allow proper deployment.

Figure 1:
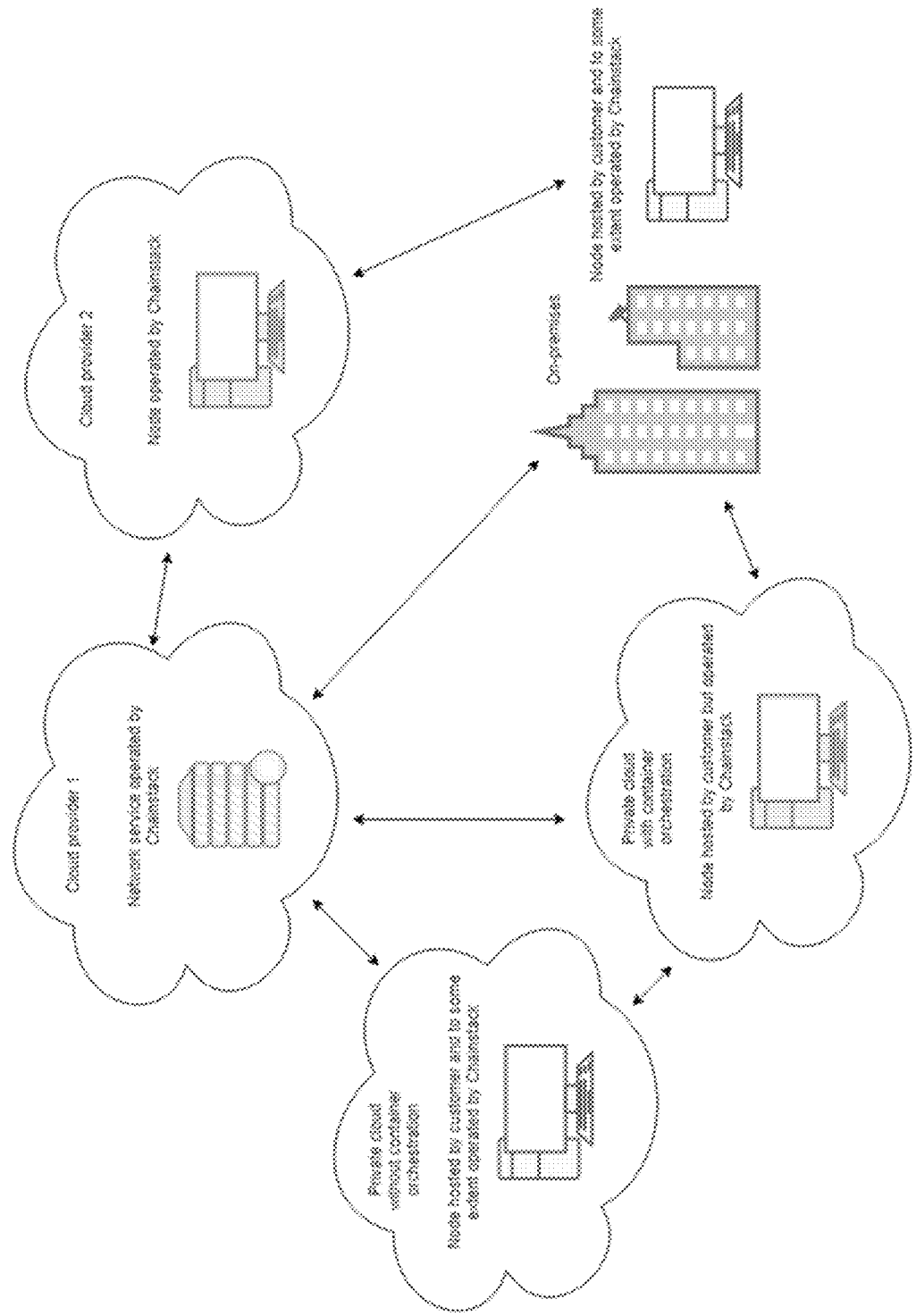
FIG. 1 is a block diagram illustrating a hybrid cloud environment, in accordance with exemplary aspects of the present disclosure.

FIG. 1 is a block diagram illustrating a hybrid cloud environment, in accordance with exemplary aspects of the present disclosure. A hybrid cloud is a cloud computing environment that uses a mix of on-premises, private cloud, third-party, and/or public cloud services with orchestration between the platforms. By allowing workloads to move between private and public clouds as computing needs and costs change, hybrid cloud gives businesses greater flexibility and more data residency options. As depicted in FIG. 1, cloud provider 1 may comprise a network service operated by a managed services provider such as Chainstack. Cloud provider 2 may comprise a node operated by a managed services provider. FIG. 1 further depicts (1) a private cloud without container orchestration, wherein a node is hosted by a customer and is managed by a managed services provider such as Chainstack in a limited basis, and (2) a private cloud with contain orchestration, wherein a node is hosted by the customer and is fully operated on by a managed services provider such as Chainstack. These four cloud types may communicate with each other and an on-premises setup in which a node is hosted by the customer and managed by a managed services provider such as Chainstack.

"Managed" may be used interchangeably with "to some extent operated by." Both phrases indicate that the managed services provider provides value add services including monitoring, troubleshooting, management on the software (blockchain) level, etc., and although such operations are instrumented (e.g., tooling is provided and preconfiguration is done), there is no complete automation by the managed services provider as the customer needs to follow particular steps himself/herself to complete the installation, restart the node, etc.

For some customers having their nodes running on-premises is critical for various reasons. For example, a customer may not want to store the ledger data on a public cloud due to regulatory compliance or other reasons. While it is less of a consideration for traditional blockchain protocols like Bitcoin and Ethereum, where all ledger data is replicated between all nodes participating in the network, it might be a useful feature for distributed ledger protocols like Hyperledger Fabric and R3 Corda, where the data can be shared only between particular network participants. A customer may also want to have a backup on-premises node running at all times or syncing with some frequency together with a primary node, which is running on a cloud. In some cases, because there are various roles of nodes in a blockchain network (e.g., a full node and a validator node), a customer may deem it important to keep more critical nodes in a more controlled environment on-premises (e.g., they want to have a node running on-premises for better network performance when they are frequently accessing the node from the same location).

Nonetheless, there are clear benefits to run part of the network in one or more clouds. These benefits include easy setup of fully managed nodes with cloud orchestration tools that a managed services provider such as Chainstack provides. In addition, there may be shared network services that need to be made accessible for all participants (e.g. ordering or a notary service) and these shared network services may be easier to setup and maintain via cloud orchestration tools. Because the shared network services may be fully managed, participants do not need to manually handle this part of the blockchain network themselves.

There are also benefits to run nodes in different public clouds as well. For example, each network participant might have different preferences in terms of cloud provider and/or data center region. If nodes are running in multiple clouds, the blockchain network becomes more decentralized and more robust to survive cloud provider failures.

The benefits of the various types of networks, as discussed above, showcase that users may desire to create nodes in networks of various settings and configurations. Accordingly, ensuring that a newly deployed node can in fact transact with the other nodes of a blockchain network is crucial.

In exemplary aspects, the method for deploying a new node may comprise (1) automatically setting up initial blockchain network in any supported cloud and region, (2) automatically deploying more nodes to the network in any supported cloud and region, (3) automatically deploying more nodes to the network in the private cloud or on-premises with the requirement that there should be a container orchestration platform available, (4) providing an easy but not automated way to deploy more nodes to the network in the private cloud or on-premises if there is no container orchestration platform available, and (5) managing and orchestrating all of the above steps.

The blockchain orchestrator disclosed herein supports various backends for deployment: public clouds with managed container orchestration services (e.g., Azure®, Google Cloud®, AWS®, etc.), as well as private clouds with container orchestration support. The presented blockchain orchestrator can configure and manage nodes across all these environments in automated or semi-automated fashion.

Figure 2:
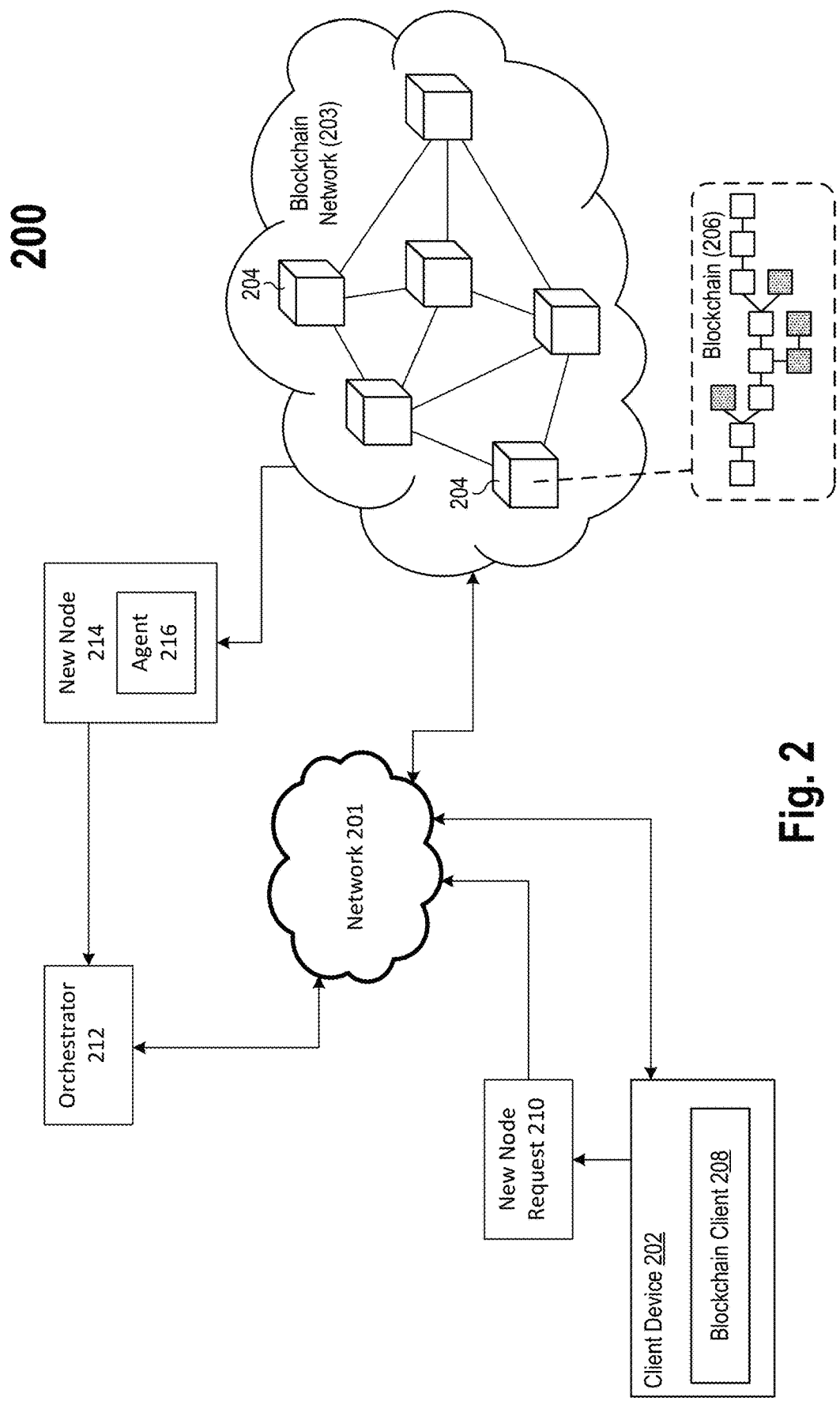
FIG. 2 is a block diagram illustrating a system of orchestrating nodes in blockchain network, in accordance with exemplary aspects of the present disclosure.

FIG. 2 is a block diagram illustrating a system 200 of deploying new nodes in a blockchain network, in accordance with exemplary aspects of the present disclosure.

The system 200 comprises a client device 202 communicating with a orchestrator 212 that controls operation of one or more nodes in a blockchain network 203 over a network 201 (e.g., the Internet). In exemplary aspects, the orchestrator 212 controls the adding, removing, configuring and operating of one or more nodes in the blockchain network 203. In exemplary aspects, a single orchestrator 212 may control operation of a portion of nodes on a plurality of blockchain networks, though only one network is shown for simplicity.

The client device 202 may comprise a blockchain client 208 that requests the creation of a new node 214 for the blockchain network 203 by submitting a new node request 210 to the orchestrator 212. The orchestrator 212 receives the new node request 210 for a new node 214 to be created and to join, for example, the blockchain network 203. The request 210 may be received from a user interface (e.g., graphical/browser based or the like) or programmatically through an application programming interface (API) or a software development kit (SDK). The orchestrator 212 forwards this request to a blockchain as a service platform providing services for the blockchain network 203 to create a new node 214. In exemplary aspects, service is not platform specific and may be any type of cloud platform capable of supporting a blockchain network such as Azure®, Google Cloud®, AWS® or the like.

According to an exemplary aspect, the blockchain network 203 can be a distributed peer-to-peer network formed from a plurality of nodes 204 (computing devices) that collectively maintain a distributed ledger, also referred to as a blockchain 206. The blockchain 206 is a continuously-growing list of data records hardened against tampering and revision using cryptography and is composed of data structure blocks that hold the data received from other nodes 204 or other client nodes, including the client device 202 and server systems executing an instance of the blockchain client 208. The blockchain client 208 is configured to transmit data values to the blockchain network 203 as a transaction data structure, and the nodes 204 in the blockchain network records and validates/confirms when and in what sequence the data transactions enter and are logged in the existing blockchain 206.

In some aspects, there might be a connection between all nodes (e.g., in case of traditional blockchains like Ethereum), or between selected nodes and network service (e.g., in case of R3 Corda where nodes talk to a network map service to discover each other and talk to each other directly to transact without broadcasting all the transactions to all nodes in the network).

A distributed ledger is a consensus of replicated, shared, and synchronized digital data geographically spread across multiple entities. In DLT, the distributed ledger database is spread across several nodes on a peer-to-peer network, where each node replicates and saves an identical copy of the ledger and updates itself independently. A blockchain is a form of DLT. A directed acyclic graph (DAG) is another form of DLT. In some aspects, DLTs may be permissioned or permission-less. In a permissioned DLT, users are not freely able to join the network, see recorded history, and record their own transactions. In a permission-less DLT, allow virtually any user to interact with a network by recording transactions and adding entries to the ledger.

The transaction data structure may contain computer-executable code, or a reference to computer-executable code stored in an existing blockchain entry, that is executed by a node in the blockchain network as part of the validation procedure. In some aspects, every node in the decentralized system can have a copy of the growing blockchain 206, avoiding the need to have a centralized ledger managed by a trusted third party. It should be noted that this does not apply to broader distributed ledger technology such as Hyperledger Fabric and R3 Corda. Nonetheless, the methods and various features of the present disclosure are applicable to the broader distributed ledger technology.

Aspects of the present disclosure work for all kinds of blockchain networks regardless of whether they are public or private. As mentioned before, due to the various types of networks and their respective configurations, a new node 214 may not be able to transact with existing nodes 204 in blockchain network 203.

Preconfiguration depends on the base layer infrastructure of the location (e.g., the device such as a server) where the node should be deployed. The base layer infrastructure may vary based on whether the blockchain network is public or private. All functionality and requirements that need to be provided to the customer to successfully run the node are packaged during preconfiguration. In some aspects, an agent (e.g., agent 216), which is a software that facilitates the node installation process, assesses the capabilities of the infrastructure platform (e.g., the device) and may provide an instruction to the customer to preinstall various packages (e.g., Docker hub) on the operating system of the device.

In general, agent 216 may detect the operating system and capabilities of the device and accordingly select and extract installation scripts. In some aspects, orchestrator 112 may automatically install the missing dependencies. For example, orchestrator 112 may determine whether a container orchestration engine required by the blockchain network exists on the location where the node is to be deployed. If not, orchestrator 112 may install the container orchestration engine. In some aspects, orchestrator 112 may determine that from a plurality of installable container orchestration engines (e.g., Kubernetes, OpenShift, VMWare, etc.), a device is only capable of properly running a certain container orchestration engine due to storage, OS, memory, and/or processing limitations of the device and the minimum requirements of each container orchestration engine. Based on the capabilities of the device, orchestrator 112 may determine that Kubernetes is the container orchestration engine (i.e., a specific missing dependency) to install on the device. It should be noted that orchestrator 112 may determine that a different container orchestration engine is more appropriate for a different device that is connecting to the blockchain network. Likewise, for a certain different blockchain network with a different set of requirements and parameters, orchestrator 112 may determine a different container orchestration engine to install on the device. Thus, depending on the unique combination of device and blockchain network, orchestrator 112 may identify different missing dependencies. In some aspects, the missing dependencies include, but are not limited to: a container orchestration engine, network capabilities, a number of communication ports, user permissions, applications, modules, libraries, plugins, etc.

In some aspects, agent 216 may provide the user with some choices on the dependencies they may desire. It should be noted that shipping a universal node may not be ideal because of the high storage and processing requirements for incorporating all possible preconfigurations.

In exemplary aspects, orchestrator 112 is run and managed by a third-party provider (e.g., Chainstack). In other words, orchestrator 112 may not be part of the blockchain network, and is instead part of the control plane that manages the blockchain network. However, there may be scenarios when a user prefers to host orchestrator 112 in their own secure infrastructure. Thus, in some aspects, orchestrator 112 may be run closer to a user's premises. More specifically, orchestrator 112 may transmit a local orchestrator engine to a user, wherein the local orchestrator engine preconfigures new nodes within a secured environment of the user with minimized latency compared to orchestrator 112. This is particularly useful if the user wants to configure and run the nodes in highly secured environment where a single central orchestrator 112 does not have access. In addition, a user may deploy several thousand nodes at once. In order to reduce processing overhead of communicating with a single central orchestrator 112, the user may be sent an orchestration engine that connects to a central orchestration engine. The engine automatically extracts the infrastructure information in a given location where the user wants to deploy the node. In this case, the user directly goes to the orchestration engine to request new node deployment.

Figure 3:
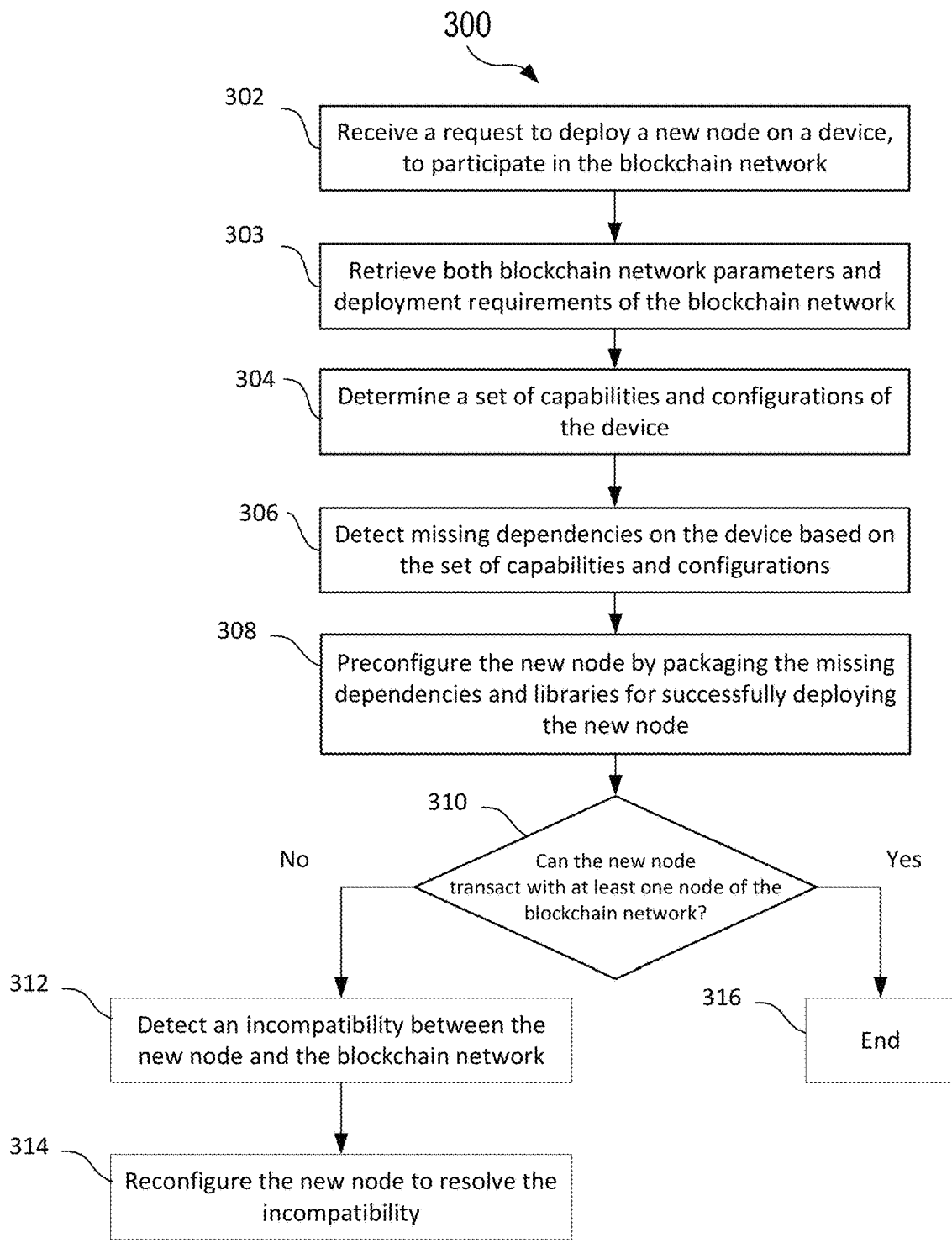
FIG. 3 is a flow diagram illustrating a method of orchestrating nodes in blockchain network, in accordance with exemplary aspects of the present disclosure.

FIG. 3 is a flowchart illustrating a method 300 of deploying new nodes in blockchain network, in accordance with exemplary aspects of the present disclosure. At 302, orchestrator 112 receives a request to deploy a new node on a device, to participate in the blockchain network. In response, orchestrator 112 may create new node 214 comprising agent 216. In some aspects, orchestrator 112 may determine a set of capabilities and configurations of the device using agent 216 that communicates with orchestrator 112.

For example, at 304, agent 216 determines a set of capabilities and configurations of the device. At 303, orchestrator 112 retrieves both blockchain network parameters and deployment requirements of the blockchain network. For example, as mentioned previously, an Ethereum network has a certain set of parameters and requirements to deploy a node.

At 306, agent 216 detects missing dependencies on the device based on the set of capabilities and configurations. For example, agent 216 may compare the blockchain network parameters and the deployment requirements with the set of capabilities and configurations. At 308, orchestrator 112 preconfigures the new node by packaging the missing dependencies and libraries for successfully deploying the new node. In some aspects, orchestrator 112 may register the new node with the blockchain network prior to installing the missing dependencies based on the deployment requirements of the blockchain network. Likewise, if the new node were ever to be removed from the blockchain network, orchestrator 112 may remove the new node from the blockchain network, and deregister the new node from the blockchain network.

At 310, orchestrator 112 determines whether the new node can transact with at least one node of the blockchain network. In some aspects, orchestrator 112 determines whether the new node can transact with at least one node of the blockchain network by creating a transaction from the new node to the at least one node, and detecting whether the transaction was successful. In some aspects, orchestrator 112 determines whether the new node can transact with at least one node of the blockchain network by determining whether the new node has been discovered by the at least one node in the blockchain network via a discovery protocol.

In response to determining that the new node can transact with the at least one node of the blockchain network, method 300 ends at 316. In response to determining that the new node cannot transact with the at least one node of the blockchain network, at 312, orchestrator 112 begins troubleshooting the deployment of the new node.

In some optional aspects, troubleshooting may comprise detecting an incompatibility between the new node and the blockchain network, and at 314, reconfiguring the new node to resolve the incompatibility. For example, orchestrator 112 may determine that a communication port is not opened on the new node, thus preventing the new node from transacting, and may open the necessary port. In another example, orchestrator 112 may determine that the new node failed to join the network due to a connectivity issue and may reattempt establishing the connection. In another example, orchestrator 112 may determine that the network configuration has been updated after the new node package was created, and may update the configuration in the package. In yet another example, orchestrator 112 may determine that the incompatibility is caused by a computer bug or glitch in a installed dependency (e.g., a required application), and may update a version of the dependency. In yet another example, orchestrator 112 may determine that the incompatibility is caused because of a change in the capabilities of the device. For example, the memory specification of the device may change (e.g., adding additional RAM), the OS of the device may be updated, the storage of the device may change. Accordingly, orchestrator 112 may reassess the dependencies that need to be reinstalled.

Figure 4:
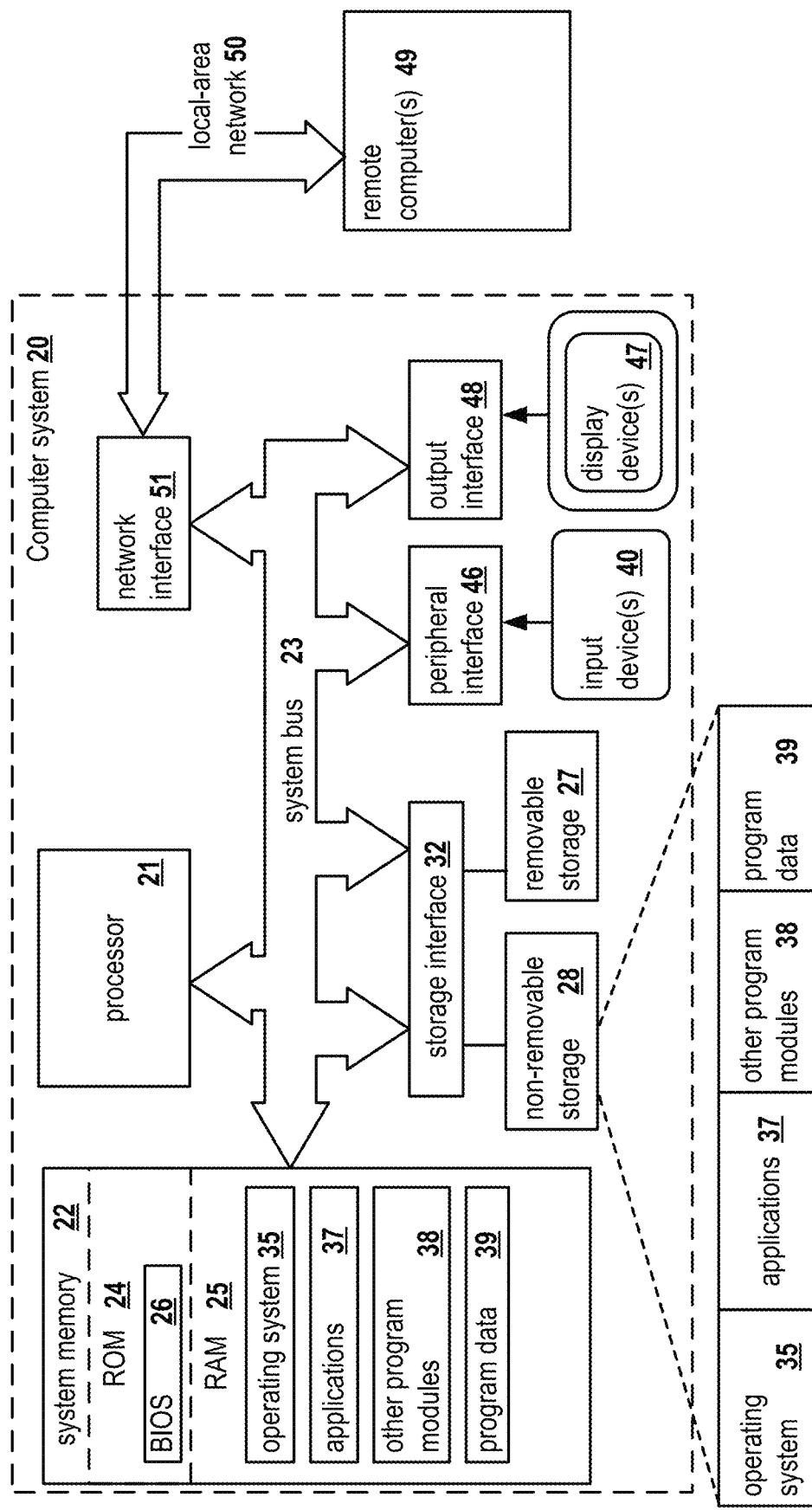
FIG. 4 is a block diagram of a computer system on which the disclosed system and method can be implemented according to an exemplary aspect.

FIG. 4 is a block diagram illustrating a computer system 20 on which aspects of systems and methods of orchestrating nodes in a blockchain network may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for orchestrating nodes in a blockchain network, the method comprising:
    receiving a request to deploy a new node on a device for participation in the blockchain network;
    retrieving both blockchain network parameters and deployment requirements of the blockchain network;
    determining a set of capabilities and configurations comprising one or more of storage, operating system, memory, and processing limitations of the device;
    detecting missing dependencies on the device by comparing the blockchain network parameters and the deployment requirements with the set of capabilities and configurations, wherein the missing dependencies comprise a container orchestrator engine;
    preconfiguring the new node by packaging the missing dependencies and libraries for successfully deploying the new node, further comprising:
        selecting, from a plurality of container orchestrator engines, a first container orchestrator engine to include in an installation of the missing dependencies in response to determining that minimum requirements to run the container orchestration engine are met by the set of capabilities and configurations of the device;
    subsequent to installing the missing dependencies and the libraries on the device, determining whether the new node can transact with at least one node of the blockchain network; and
    in response to determining that the new node cannot transact with the at least one node of the blockchain network, troubleshooting deployment of the new node.

2. The method of claim 1, wherein troubleshooting the deployment further comprises:
    detecting an incompatibility between the new node and the blockchain network; and
    reconfiguring the new node to resolve the incompatibility.

3. The method of claim 1, further comprising:
    receiving a request to deploy the new node on a different device for participation in the blockchain network;
    determining a set of capabilities and configurations of the different device;
    detecting a different set of missing dependencies on the different device; and
    preconfiguring the new node on the different device by packaging the different set of missing dependencies and libraries for successful deployment.

4. The method of claim 1, further comprising:
    receiving a request to deploy the new node on the device for participation in a different blockchain network;
    retrieving both blockchain network parameters and deployment requirements of the different blockchain network;
    detecting a different set of missing dependencies on the device; and
    preconfiguring the new node on the device by packaging the different set of missing dependencies and libraries for successful deployment in the different blockchain network.

5. The method of claim 1, wherein a type of the blockchain network is one of a hybrid cloud environment, a private cloud environment, and a public cloud environment, further comprising preconfiguring the new node further based on the type of the blockchain network.

6. The method of claim 1, wherein the missing dependencies comprise at least one of:
    network capabilities;
    a number of communication ports; and
    user permissions.

7. The method of claim 1, wherein determining whether the new node can transact with at least one node of the blockchain network comprises:
creating a transaction from the new node to the at least one node; and
detecting whether the transaction was successful.

8. The method of claim 1, wherein determining whether the new node can transact with at least one node of the blockchain network comprises determining whether the new node has been discovered by the at least one node via a discovery protocol.

9. The method of claim 1, further comprising:
in response to receiving the request, transmitting a local orchestrator engine to a user, wherein the local orchestrator engine preconfigures new nodes within a secured environment of the user with minimized latency.

10. The method of claim 1, further comprising:
registering the new node prior to installing the missing dependencies based on the deployment requirements of the blockchain network.

11. The method of claim 1, wherein determining the set of capabilities and configurations of the device comprises receiving the set of capabilities and configurations from an agent installed on the device, wherein the agent communicates with an orchestration engine.

12. The method of claim 1, further comprising:
removing the new node from the blockchain network; and
deregistering the new node from the blockchain network.

13. A system for orchestrating nodes in a blockchain network, the system comprising:
a hardware processor configured to:
receive a request to deploy a new node on a device for participation in the blockchain network;
retrieve both blockchain network parameters and deployment requirements of the blockchain network;
determine a set of capabilities and configurations comprising one or more of storage, operating system, memory, and processing limitations of the device;
detect missing dependencies on the device by comparing the blockchain network parameters and the deployment requirements with the set of capabilities and configurations, wherein the missing dependencies comprise a container orchestrator engine;
preconfigure the new node by packaging the missing dependencies and libraries for successfully deploying the new node, further comprising:
selecting, from a plurality of container orchestrator engines, a first container orchestrator engine to include in an installation of the missing dependencies in response to determining that minimum requirements to run the container orchestration engine are met by the set of capabilities and configurations of the device;
subsequent to installing the missing dependencies and the libraries on the device, determine whether the new node can transact with at least one node of the blockchain network; and
in response to determining that the new node cannot transact with the at least one node of the blockchain network, troubleshoot deployment of the new node.

14. The system of claim 13, wherein the hardware processor is configured to troubleshoot the deployment by:
detecting an incompatibility between the new node and the blockchain network; and
reconfiguring the new node to resolve the incompatibility.

15. The system of claim 13, wherein the hardware processor is further configured to:
receive a request to deploy the new node on a different device for participation in the blockchain network;
determine a set of capabilities and configurations of the different device;
detect a different set of missing dependencies on the different device; and
preconfigure the new node on the different device by packaging the different set of missing dependencies and libraries for successful deployment.

16. The system of claim 13, wherein the hardware processor is further configured to:
receive a request to deploy the new node on the device for participation in a different blockchain network;
retrieve both blockchain network parameters and deployment requirements of the different blockchain network;
detect a different set of missing dependencies on the device; and
preconfigure the new node on the device by packaging the different set of missing dependencies and libraries for successful deployment in the different blockchain network.

17. The system of claim 13, wherein a type of the blockchain network is one of a hybrid cloud environment, a private cloud environment, and a public cloud environment, further comprising preconfiguring the new node further based on the type of the blockchain network.

18. The system of claim 13, wherein the missing dependencies comprise at least one of:
network capabilities;
a number of communication ports; and
user permissions.

19. The system of claim 13, wherein the hardware processor is further configured to determine whether the new node can transact with at least one node of the blockchain network by:
creating a transaction from the new node to the at least one node; and
detecting whether the transaction was successful.

20. A non-transitory computer readable medium storing thereon computer executable instructions for orchestrating nodes in a blockchain network, including instructions for:
receiving a request to deploy a new node on a device for participation in the blockchain network;
retrieving both blockchain network parameters and deployment requirements of the blockchain network;
determining a set of capabilities and configurations comprising one or more of storage, operating system, memory, and processing limitations of the device;
detecting missing dependencies on the device by comparing the blockchain network parameters and the deployment requirements with the set of capabilities and configurations, wherein the missing dependencies comprise a container orchestrator engine;
preconfiguring the new node by packaging the missing dependencies and libraries for successfully deploying the new node, further comprising:
selecting, from a plurality of container orchestrator engines, a first container orchestrator engine to include in an installation of the missing dependencies in response to determining that minimum requirements to run the container orchestration engine are met by the set of capabilities and configurations of the device;
subsequent to installing the missing dependencies and the libraries on the device, determining whether the new node can transact with at least one node of the blockchain network; and in response to determining that the new node cannot transact with the at least one node of the blockchain network, troubleshooting deployment of the new node.

21. The method of claim 1, wherein a second container orchestrator engine from the plurality of container orchestrator engines is selected for a different device on the blockchain network based on a set of capabilities and configurations of the different device meeting minimum requirements of the second container orchestrator engine.

\* \* \* \* \*